United States Patent [19]

Mathews

[11] 4,292,790
[45] Oct. 6, 1981

[54] BLADE ARRANGEMENT FOR MULTIPLE ROTOR MOWERS

[76] Inventor: Bernard C. Mathews, 8606 Rte. 176, Crystal Lake, Ill. 60014

[21] Appl. No.: 188,505

[22] Filed: Sep. 18, 1980

[51] Int. Cl.³ .......................................... A01D 55/18
[52] U.S. Cl. ........................................ 56/13.6; 56/6
[58] Field of Search .............. 56/6, 13.6, 192, 295, 56/16.7

[56] References Cited

U.S. PATENT DOCUMENTS

| | | | |
|---|---|---|---|
| 3,040,502 | 6/1962 | Smith et al. | 56/13.6 |
| 3,389,539 | 6/1968 | Zubegers | 56/13.6 |
| 3,507,102 | 4/1970 | Kline et al. | 56/13.6 |
| 3,524,306 | 8/1970 | Reber | 56/13.6 |
| 3,931,859 | 1/1976 | van der Lely | 56/13.6 |
| 3,972,158 | 8/1976 | Lindstrom | 56/13.6 |
| 4,177,625 | 12/1979 | Knight et al. | 56/13.6 |

FOREIGN PATENT DOCUMENTS

| | | | |
|---|---|---|---|
| 2843063 | 4/1979 | Fed. Rep. of Germany | 56/13.6 |
| 2816144 | 10/1979 | Fed. Rep. of Germany | 56/13.6 |

Primary Examiner—Paul J. Hirsch
Attorney, Agent, or Firm—Kenneth T. Snow

[57] ABSTRACT

A mower of the multiple rotor type in which each rotor has radial mowing blades extending into the transverse plane of adjacent rotors and the blades of adjacent rotors being vertically offset from one another. More specifically the multiple rotors are transversely aligned and are provided with horizontally disposed discs all aligned in a horizontal plane. The mowing blades on alternate discs are associated with the top side of the discs and the mowing blades on the intermediate alternate discs are associated with the under side of the discs. Thus the cooperative blades of any adjacent discs are vertically offset from one another.

7 Claims, 5 Drawing Figures

BLADE ARRANGEMENT FOR MULTIPLE ROTOR MOWERS

BACKGROUND OF THE INVENTION

1. Field of the Invention

The present invention is concerned with mowers of the multiple rotor type. A series of side-by-side horizontally disposed discs rotating in opposite directions and having mowing blades associated therewith are adapted to cut hay and grasses and effect a windrowing of the cut hay and grasses between adjacent cooperative discs.

Although the blades from each of the rotors extend radially outwardly beyond the extent of the disc with which they are associated and into the field occupied by the adjacent disc there is no conflict of the mowing blades. In the past this possibility of blade conflict has been avoided by accurate "timing" of the disc drives. In the absence of such timing the conflict of blades was attempted to be rendered harmless by the yieldable mounting of such blades.

It is the present invention to provide for the transverse overlap of cutting of adjacent discs without blade conflict and without any drive timing. This is accomplished by vertically offsetting the blades of adjacent rotors —one set of blades being disposed beneath the disc and the blades of the adjacent disc or discs being disposed above the discs.

2. Description of the Prior Art

The prior United States mower patents to Zweegers U.S. Pat. Nos. 3,389,539; 3,391,522; and 3,443,369 and the United States patent to Van der Lely U.S. Pat. No. 3,550,360 all disclose the general feature of an aligned series of rotors extending transversely of the line of travel of the mowers. The rotors are provided with radially extending mowing blades which coact with each other to effect a cutting of hay and grasses. Each of these prior United States patents is and must be provided with a rotational drive for the rotors which are "timed" relative to each other to avoid blade contact.

My own prior U.S. Pat. No. 4,160,356 shows a similar type of mower and is particularly concerned with effecting rotational drive for the series of rotors. Attention is particularly directed to the "canting" of the rotors in FIG. 8 of the drawings of my earlier patent. The canting was employed to prevent blade contact between adjacent rotors without any special timing of the drive of those rotors.

In my presently pending application for United States patent, Ser. No. 140,617 I have utilized spring wire blades for association with mower rotors to make timing unnecessary. However, it has been found in practice that it is desirable to prevent any physical contact between the cooperative blades of mowers of this type. The present invention provides the mower cutting blades on the top side of one mower disc and on the bottom side of the adjacent mower discs. With all of the discs being horizontally aligned this means that although the mower can cut a full uninterrupted transverse swath there will be no blade interference because the cooperative blades are all vertically offset from one another.

SUMMARY OF THE INVENTION

A principal object of the present invention is to provide a novel blade arrangement for multiple rotor mowers which will prevent unwarranted physical contact of the blades.

An important object of this invention is to provide a novel vertically offset blade arrangement for mowers of the type employing transversely aligned multiple discs which rotate in opposite directions.

Another important object of this invention is to provide a mower having a plurality of generally transversely aligned discs all in a single horizontal plane and having a novel arrangement of radially extending blades associated with each of the discs and projecting beyond the circumference of the disc and into the field of an adjacent disc without having physical contact with one another and not resorting to drive timing or canting of the discs to prevent such physical conflict.

Still another important object of this invention is to provide a mower as defined in the preceding object in which the mowing blades of adjacent discs are vertically offset from one another.

Another and still further important object of this invention is to provide a mower as defined in the preceding two objects in which the mowing blades of alternate discs are associated with the top side of the discs and the mowing blades of the intermediate alternate discs are associated with the under side of the discs.

Other and further important objects and advantages of this invention will become apparent from the disclosures in the following specification and accompanying drawings.

IN THE DRAWINGS

AS SHOWN IN THE DRAWINGS

Figure 1:
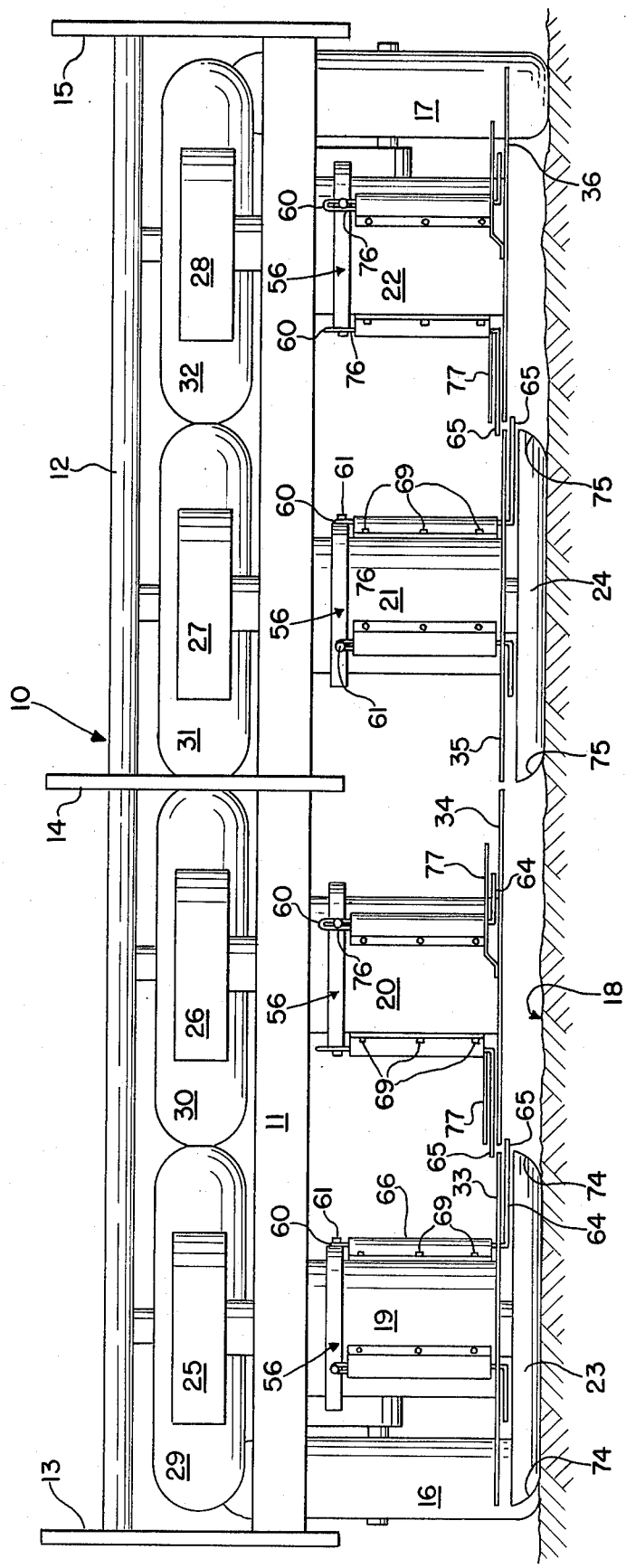
FIG. 1 is a front elevational view of the mower of this invention having a plurality of side-by-side mowing rotors.

The reference numeral 10 indicates generally the frame structure of the mower of this invention. The frame structure includes a first transversely extending beam 11 and a second upwardly spaced apart parallel beam 12. These parallel beams 11 and 12 are joined by vertically disposed members 13, 14 and 15. The frame structure 10 is supported by laterally spaced apart ground engaging wheels 16 and 17. The ground or terrain over which the mower of this invention traverses is designated by the numeral 18.

A plurality of mowing rotors is transversely aligned across the front of the mower. These rotors 19, 20, 21, and 22 are journally supported in the transverse beam 11. Although four rotors are shown herein it should be understood that any number of rotors may be employed. However, it is preferred that the rotors be an even number so that any two adjacent rotors may cooperate with each other to effect a cutting and a windrowing of the cut crop between those two rotors. In the present invention the mowing rotors of alternate rotors are constructed the same while the mowing rotors of intermediate alternate rotors will be constructed the same. Here the alternate rotors are designated as rotors 19 and 21 and the intermediate alternate rotors are designated as rotors 20 and 22.

Only the alternate rotors are provided with ground engaging skids. A circularly shaped skid 23 is provided beneath the rotor 19 and a similar circularly shaped skid is provided beneath the rotor 21.

Steel cylinders 25, 26, 27 and 28 are respectively provided above and concentric with each of the mowing rotors 19 to 22. These cylinders 25 to 28 are located above the transverse beam 11 and below the beam 12. Pneumatic tired wheels 29, 30, 31 and 32 are adapted to frictionally impart rotational drive to each other and to the steel cylinders to effect drive of the mowing rotors in opposite directions as defined in my prior U.S. Pat. No. 4,160,356. Here the pneumatic tired wheels are carried on and depend from the upper portion of the frame structure 10.

Each of the mowing rotors is provided with a large diameter horizontally disposed disc 33, 34, 35 and 36 respectively. All of the discs lie in a single horizontal plane at the lower ends of the rotors 19 to 22. The large discs are only slightly spaced apart as shown in FIG. 1.

Figure 2:
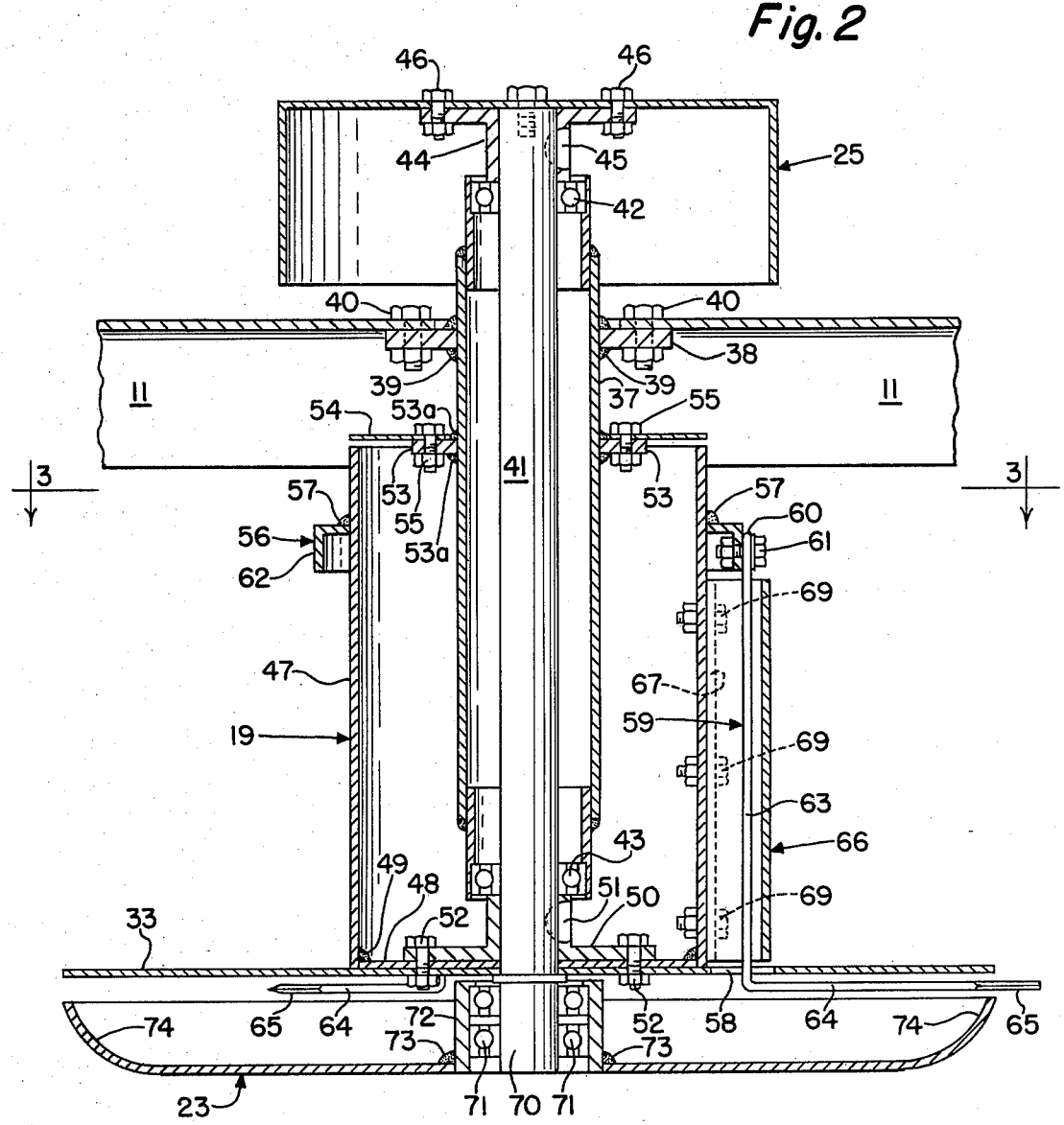
FIG. 2 is an enlarged vertical sectional view taken through one of the mowing rotors of FIG. 1 having a ground engaging skid thereunder. Section taken on line 2—2 of FIG. 3.

The specifics of the rotors are disclosed in the enlarged view of FIG. 2. A vertical tube or sleeve 37 is located within the rotor 19. A first circularly shaped flange rim 38 is welded at 39 to an upper outer surface of the tube 37. A plurality of cooperative bolts and nuts 40 are employed to affix the tube 37 and its integral flange 38 to the transverse frame structure beam 11. A vertically disposed drive shaft 41 is journally supported concentrically within the tube 37 which is stationary. A first bearing assembly 42 is provided at the upper end of the shaft 41 and a second downwardly spaced bearing assembly 43 is provided near the lower end of the shaft 41. The bearings 42 and 43 are thus vertically spaced apart and provide for the suitable holding of the rotating shaft 41 within the stationary tube 37. The shaft 41 is driven and receives such rotational drive by reason of the pneumatic tired wheel 29 frictionally engaging the outer cylindrical surface of the cylinder 25.

A hub 44 is provided for the cylinder 25 and is keyed at 45 to the shaft 41. A plurality of cooperative bolts and nuts 46 are employed to join the cylinder 25 to the hub 44. Thus as the cylinder 25 is rotatably driven so also is the shaft 41.

A relatively large sleeve 47 forms the main body of the rotor 19. A circular bottom 48 is welded to the underside of the sleeve 47 at 49. A hub 50 is provided for the rotor 19 at the center of the bottom 48. The hub 50 is keyed at 51 to the shaft 41 to thereby provide for the rotational drive of the rotor 19. Cooperative bolts and nuts 52 pass vertically through the hub 50, the rotor bottom 48 and the enlarged horizontal disc 33 and act to hold these elements together as a unit.

A second lower rim or flange 53 is welded to the inner support tube 37 at a position vertically below the first circular flange 38. Here the weld is identified as 53a. A mowing rotor top or enclosure cover 54 is affixed by means of cooperative bolts and nuts 55 to the flange 53. This top is thus stationary along with the tube 37, but acts to prevent the accumulation of debris from a mowing operation within the mowing rotor 19.

A circular member 56, comprising a right angle member in cross section is welded at 56 to the outer cylindrical surface of the rotor sleeve 47. Notches 58 in the surface of the disc 33 are generally of radial extent and permit mowing blades to pass through to the underside of that disc 33. L-shaped spring wire mowing blades 59 have been generally defined in my copending application for United States patent, Ser. No. 140,617. Each blade is provided with a hook 60 at its upper end. A cooperative bolt and nut 61 is employed to pass horizontally through the hook 60 and into and through the vertically depending flange or rim 62 of the circular member 56. The spring wire blades 59 have vertical legs 63 which pass down through the notches 58 in both of the discs 33 and 35 of their respective rotors 19 and 21. The horizontal legs 64 of the L-shaped wire blades 59 join the vertical legs immediately beneath the discs 33 and 35 whereas in the intermediate alternate discs 34 and 36 the horizontal legs 64 pass over the tops thereof. The outer radial ends of each of the horizontal legs 64 as shown at 65 constitutes the hay or grass cutting portion of the mowing blades. These cutting ends 65 extend radially outwardly of the circumferential extent of the horizontal disc 33. Further this cutting end 65 continues outwardly through the space between adjacent discs so cutting will be continuous across the full transverse extent of the multiple rotors. This is true because the blades of adjacent rotors overlap one another in their transverse extent.

A U-shaped enclosure or housing is provided at 66 for each of the vertical legs of the L-shaped wire blades. These enclosures generally confine and limit movement of the vertical legs to a radial movement rather than a possible arcuate movement relative to the rotor on which it is mounted at its upper end. Each U-shaped housing 66 is equipped with side flanges 67 and 68 which conform to the cylindrical surface of the rotor. These flanges 67 and 68 abut the outer surface of the rotor and by means of cooperative bolts and nuts 69 passing therethrough the U-shaped enclosures are fastened to the rotor sleeves 47.

A downward axial extension 70 of the drive shaft 41 is provided for the rotors 19 and 21 only. A bearing assembly 71 having their inner races pressed on the shaft extension 70 is adapted to supportingly carry a cylindrical hub 72. The hub 72 is disposed centrally of the circular skid 23 and is welded thereto at 73. The skid hub 72 is thus journally carried on the outer races of the bearing assembly 71. This permits the skid 23 to freely rotate or remain stationary on the shaft extension 70. The skid is not driven by the shaft 41. The circular skid 23 is equipped with an upturned circumferential edge 74. This generally provides a housing and shield for the mowing blades located beneath the disc 33 from any possible deleterious effects of riding directly on the ground. The skid also provides ground support for the entire mower as it is driven thereover. A similar upturned circumferential edge 75 is provided on the skid 24. The ground support for the mower is thus gained from the skids employed on each of the alternate rotors of the multiple rotors which have the mowing blades located beneath the horizontal discs.

Figure 5:
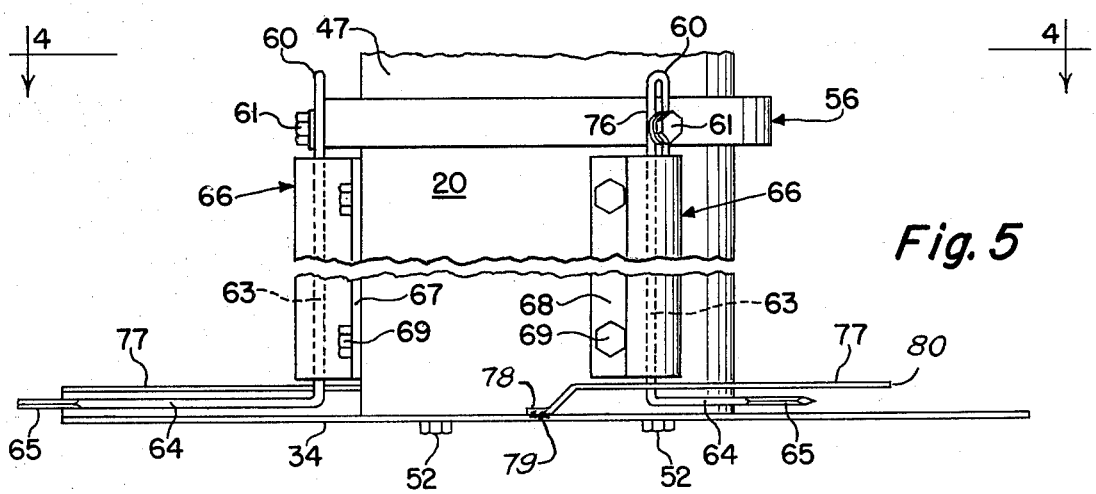
FIG. 5 is an elevational view taken of one of the mowing rotors of FIG. 1 without a ground engaging skid. The elevational view is taken on the line 5—5 of FIG. 4.
Figure 3:
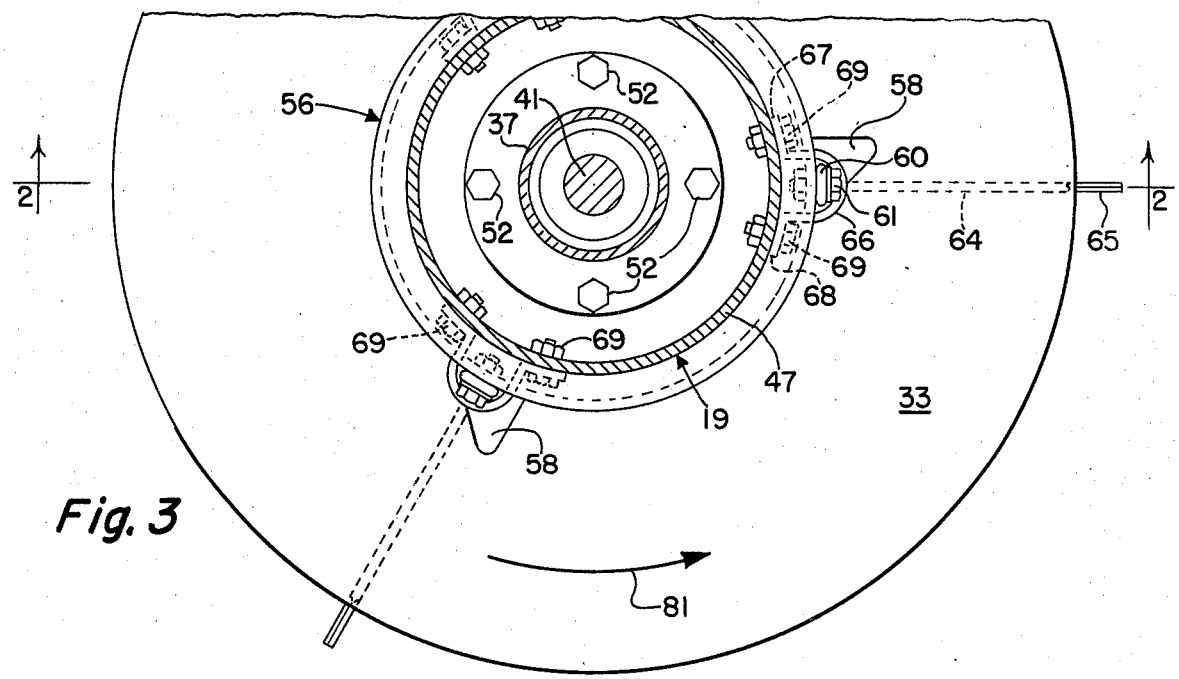
FIG. 3 is a transverse sectional view taken on the line 3—3 of FIG. 2 and having parts thereof broken away.
Figure 4:
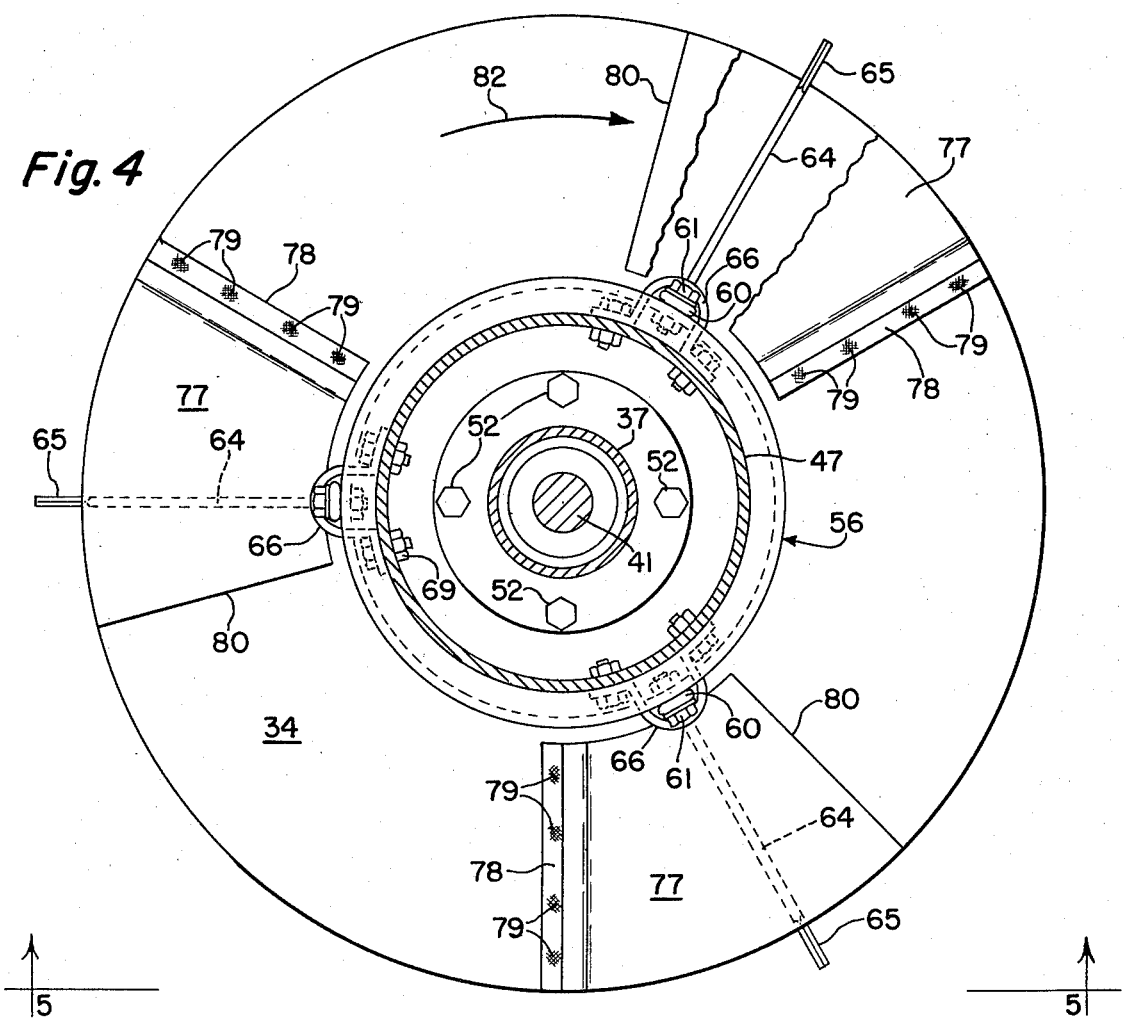
FIG. 4 is a transverse sectional view comparable to that of FIG. 3 but taken through one of the mowing rotors of FIG. 1 without a ground engaging skid. The section is taken along the line 4—4 of FIG. 5.

FIGS. 4 and 5 best show the details of the rotor 20 and thus also the other intermediate alternate rotor 22. All like parts of the rotors 19 and 20 are identified with the same reference numerals. There are no notches in discs 34 and 36 comparable to the notches 58 present in the discs 33 and 35 because the mowing blades do not pass beneath those discs. The spring wire blades 59 are identical for all the rotors. As best shown in FIG. 5 the hook 60 thereof is elongated to permit the blade 59 to be vertically disposed through a substantial range. This elongation is shown at 76. It should be clear from viewing FIG. 5 that the hook 60 of the spring wire blade is spaced substantially upwardly above the locking bolt 61 to thereby cause the horizontal leg thereof be disposed above the surface of the disc 34. Whereas in FIG. 2 the hook 60 has the locking bolt 61 located in or near the upper end to cause or permit the horizontal leg of the blade to extend below the horizontal disc 33. Thus the elongation 76 of the hook 60 permits the vertical adjustment of the blade relative to the rotor on which it is mounted.

The subject invention provides for alternate rotors of a plurality of in-line rotors to have the horizontal cutting portions of mowing blades to be at different vertical levels to prevent the physical conflict of blades despite the fact the blades extend into each other's transverse path. The transverse overlapping of the blades insures a full uninterrupted cut across the entire mower and this is accomplished without a timing of the drives for the rotors. It is the differential in vertical level of the blades of adjacent rotors that guarantees the avoidance of blade conflict. In the present instance the cutting blades are disposed above and below the discs with which they are associated.

When the blades are arranged above the disc as in FIGS. 4 and 5 it is preferable that the horizontal extent of the blades be shielded from the cut crop and other debris accompanying a mowing operation. Here a sheet metal blade covering arcuately shaped element 77 is provided for the desired shielding. The arcuate element 77 is equipped with a leading edge 78 which is spot welded or otherwise attached to the disc 34 as shown at 79. The upwardly spaced trailing edge 80 of the shield 77 is free and open. Thus the blades beneath such shields are protected during mowing and yet may yield in a swinging motion beneath the shield when striking an obstruction.

In the present invention it is desirable that the rotor 19 be driven in the direction of the arrow 81 located on the surface of the disc 33 associated with the rotor 19. Similarly the rotor 20 should be rotated in the opposite direction as shown by the arrow 82 located on the surface of the disc 34 in FIG. 4. Similarly the rotor 21 will be rotated as rotor 19 and rotor 22 will be rotated as rotor 20. Thus as the rotors are rotated inwardly in pairs the cut swath of hay or other grasses will be windrowed between the adjacent rotors 19 and 20 and between the adjacent rotors 21 and 22. The U-shaped housings or enclosures 66 act to aid in the rearward movement of the cut crop between these adjacent rotors.

The invention herein lies in the differential in vertical disposition of the horizontal cutting blades of adjacent rotors in a mower consisting of a multiple of in-line side-by-side rotors. This vertical differential insures that there shall be no detrimental physical contact of the cutting blades despite the fact they overlap and cut a full swath. It has been found to be immaterial or that the differential in cutting heights is of no consequence in the effective cutting of a hay crop. In the showing herein the mowing blades are located on top of and beneath the horizontal discs of the mowing rotors. Although the drawings show the outer rotor to have the cutting blade disposed at the lower level beneath the disc and then the levels of the blades alternating on the rotors as they progress inwardly this is unimportant. The outer rotor could indeed have the blade at the upper level and the inwardly alternating rotors being first down and then up and so on to the end of the multiple rotors. When we define a series of alternating rotors it should be understood it is meant all of those rotors have their cutting blades at one height, either up or down. When we say intermediate alternate rotors we mean that group of rotors has the blades disposed just the opposite to the level of the alternating rotors.

I am aware that numerous details of construction may be made throughout a wide range without departing from the principles shown herein and I do not propose limiting the patent granted hereon otherwise than as necessitated by the appended claims.

What is claimed is:

1. A mower comprising a frame structure, a series of adjacent, horizontally disposed discs carried on said frame structure, said discs arranged in a single horizontal plane and having the circumferences of adjacent discs spaced slightly apart from one another, mowing blades associated with each of said discs, said mowing blades in their cutting position having a radial extent greater than the circumferences of the discs and continuing radially outwardly through the space between adjacent discs, the mowing blades of alternate discs being disposed beneath the discs and the mowing blades of the intermediate alternate discs being disposed above the discs, whereby although the blades of adjacent discs overlap the extent of each other they do not contact one another by reason of their being vertically offset.

2. A mower as set forth in claim 1 in which each of the alternate discs having the mowing blades disposed beneath the discs is provided with a ground engaging skid disposed beneath the mowing blades.

3. A mower having a plurality of side-by-side vertically disposed rotors, each of said rotors having a relatively large diameter horizontally disposed disc at its lower end, said discs of the plurality of rotors all disposed in the same horizontal plane, the diameters of each of said discs being such that the circumferences of adjacent discs will have a short space therebetween, a plurality of blades associated with each of said rotors, each blade comprising a horizontally disposed member extending radially beyond the circumference of the disc and spanning the space between adjacent discs, means mounting the blades of alternate rotors below the discs, and means mounting the blades of the intermediate alternate rotors above the discs resulting in adjoining discs having one set of blades below the disc and the other above the disc with the result the blades of adjacent discs are vertically offset from one another.

4. A mower as set forth in claim 3 in which each of the alternate discs having the mowing blades mounted below those discs has a circularly shaped, circumferential edge upturned, ground engaging skid journally mounted on the rotors carrying said discs.

5. A mower having a plurality of side-by-side vertically disposed rotors, each of said rotors having a relatively large diameter horizontally disposed disc at its lower end, said discs of the plurality of rotors all disposed in the same horizontal plane, the diameters of each of said discs being such that the circumferences of adjacent discs will have a short space therebetween, a plurality of blades associated with each of said rotors, each blade comprising an L-shaped spring wire, a vertically disposed leg of the L-shaped wire disposed adjacent the rotor, means attaching the upper end of said vertical leg to a high position on said rotor, the discs of alternate rotors having openings therein adjacent the rotor to permit passage of the lower end of the vertical leg of the blade, a horizontally disposed leg of the L-shaped wire adjoining the vertical leg immediately beneath the discs, each horizontal leg of the blade extending radially beyond the circumference of the disc and spanning the space between adjacent discs, the discs of the intermediate alternate rotors having the horizontally disposed legs of the L-shaped wire adjoining the vertical leg immediately above the disc resulting in adjoining discs having one set of horizontal blades below the disc and the other above the disc with the result the blades of adjacent discs are vertically offset from one another.

6. A mower as set forth in claim 5 in which a radially projecting U-shaped shield is attached to said rotors and acts to house and confine each of the vertically disposed legs of the L-shaped spring wire blades.

7. A mower as set forth in claim 6 in which each of the alternate discs having the horizontally disposed legs of the spring wire blades disposed therebelow has a circularly shaped circumferential edge upturned, ground engaging skid journally mounted on the rotor carrying said discs.

* * * * *